United States Patent
Benderius

(10) Patent No.: US 9,402,035 B2
(45) Date of Patent: Jul. 26, 2016

(54) METHOD AND APPARATUS FOR DETERMINING EXPOSURE SETTING

(71) Applicant: Axis AB, Lund (SE)

(72) Inventor: Björn Benderius, Stehag (SE)

(73) Assignee: Axis AB, Lund (SE)

( * ) Notice: Subject to any disclaimer, the term of this patent is extended or adjusted under 35 U.S.C. 154(b) by 0 days.

(21) Appl. No.: 14/696,023

(22) Filed: Apr. 24, 2015

(65) Prior Publication Data

US 2015/0312460 A1 Oct. 29, 2015

(30) Foreign Application Priority Data

Apr. 24, 2014 (EP) .................................... 14165865

(51) Int. Cl.
*H04N 5/235* (2006.01)
*G03B 7/00* (2014.01)

(52) U.S. Cl.
CPC ............. *H04N 5/2353* (2013.01); *H04N 5/235* (2013.01); *H04N 5/2356* (2013.01); *G03B 7/00* (2013.01)

(58) Field of Classification Search
CPC .... H04N 5/2353; H04N 5/353; H04N 5/2356
See application file for complete search history.

(56) References Cited

U.S. PATENT DOCUMENTS

| | | | |
|---|---|---|---|
| 6,831,695 B1 * | 12/2004 | Tamayama | H04N 5/235 348/221.1 |
| 7,349,574 B1 | 3/2008 | Sodini et al. | |
| 2012/0177352 A1 * | 7/2012 | Pillman | H04N 5/2354 396/61 |
| 2014/0111674 A1 * | 4/2014 | Iwasaki | H04N 5/361 348/294 |

FOREIGN PATENT DOCUMENTS

| | | |
|---|---|---|
| EP | 2 552 099 A1 | 1/2013 |
| WO | 2005001563 A1 | 1/2005 |

* cited by examiner

*Primary Examiner* — Tuan Ho
(74) *Attorney, Agent, or Firm* — Volpe and Koenig, P.C.

(57) ABSTRACT

A device and method for determining exposure settings in a camera is disclosed. The method comprises capturing an image frame using an image sensor, the exposure of the capturing is based on an initial exposure value setting, determining a temporary exposure value by finding an exposure value that results in a substantially optimum value when applied to a total cost calculation, calculating a saturated pixels cost related to the saturated pixels for the captured image at the temporary exposure value, determining a next exposure value by finding a decrease in exposure value, in relation to the temporary exposure value, for which decrease a change in total cost for non-saturated pixels, in relation to the total cost for non-saturated pixels at the temporary exposure value, is substantially equal to the saturated pixel cost calculated at the temporary exposure value, using this determined next exposure value for capturing a new image frame.

14 Claims, 4 Drawing Sheets

METHOD AND APPARATUS FOR DETERMINING EXPOSURE SETTING

FIELD OF INVENTION

The present invention relates to a method and an apparatus for setting of the exposure of an image capturing device. Moreover, the invention relates to a process for determining exposure settings for the capture of images and motion video.

BACKGROUND

Image capturing by means of technical means is increasing as more and more people are walking around with devices capable of capturing still images and/or motion video. Moreover, captured images, still images and/or motion video, are increasingly used in monitoring and surveillance systems. In order to capture image information for a particular use, the exposure of the image sensor to the light it is to capture has to be precisely controlled. In order to make it easier for an end user to capture usable images, automatic schemes for setting the proper exposure has been developed. Such automatic schemes for setting the exposure are of particular importance in systems continuously capturing still images and/or motion video during an extended period of time. For example, the lighting conditions may vary substantially during any extended time period, in particular during evenings, mornings, and time periods extending over an entire day. The lighting conditions may also vary substantially during shorter time periods due to changes in weather, changes in cloud cover, and changes to the illumination of the scene, e.g. electrical lights are turned on or off.

In some cameras the exposure settings for the scene in front of the camera are automatically calculated based on inputs from separate light meters mounted in the cameras. In other cameras the exposure settings for the scene are automatically calculated based on image data captured by the image sensor of the camera. One example of the use of the image data from the image sensor for calculating exposure settings is presented in U.S. Pat. No. 8,446,480 B2 (KALEVO). This patent describes a method and an apparatus for exposure control. A histogram of the number of sensor elements in an image sensor that receive light at a specific intensity is determined. Moreover cost functions expressing the performance of the image sensor as a function of received light intensity is available for a plurality of exposure times. Then an exposure time is determined based on this histogram and the cost function. The teachings of the documents relates to finding the exposure for the capture of a still image. One problem with the above method is that the method is designed for use in capturing single still images and that the teaching of it therefore does not address problems related to capturing motion video or still images captured as part of a series representing a camera view over an extended time period.

SUMMARY

One object of the present invention is to provide an improved method for calculating exposure settings for motion video capturing processes.

The object is achieved by means of a method according to claim 1 and by means of an image capturing device according to claim 12. Further embodiments of the invention are presented in the dependent claims.

In particular, according to one embodiment of the invention, a method comprises capturing an image frame by means of an image sensor, the exposure of the capturing is based on an initial exposure value setting, determining a temporary exposure value by finding an exposure value that results in a substantially optimum value when applied to a total cost calculation, wherein the calculating of said total cost from a specific exposure value is based on signal levels at the specific exposure value of image pixels in the captured image frame combined with a cost function, calculating a saturated pixels cost related to the saturated pixels for the captured image at the temporary exposure value, determining a next exposure value by finding a decrease in exposure value, in relation to the temporary exposure value, for which decrease in exposure value a change in total cost for non-saturated pixels, in relation to the total cost for non-saturated pixels at the temporary exposure value, is substantially equal to the saturated pixel cost calculated at the temporary exposure value, and using this determined next exposure value for capturing a new image frame. One advantage of this method is that images captured after each other, i.e. for a motion video, has a stable exposure setting that does not oscillate. Moreover, this method is fast.

In another embodiment the method further includes inserting substantially every captured image frame in a motion video stream. The advantage of avoiding oscillating exposure becomes even more pronounced in such an embodiment.

In one embodiment the capturing of the new image frame initiates repetition of the steps of determining a temporary exposure value, determining a saturated pixel cost value, and determining a next exposure value for capturing a further image frame.

According to one embodiment the calculation of the total cost is based on a histogram of the captured image combined with a cost function, the histogram is representing number of pixels at different intensity levels of the captured image frame at the specific exposure value. The advantage of using a histogram is that the process may require less processing capacity than if no histogram is used. Moreover, the amount of data required to be stored may also be decreased.

In one embodiment a histogram is a function representing the number of image sensor elements of an image sensor that receive light at specific intensity levels during a exposure time.

According to another embodiment the act of calculating a total cost for a specific exposure value, in the act of determining a temporary exposure value, includes calculating from the captured image data a plurality of histograms representing different exposure values, multiplying the histogram value for each registered intensity level with a cost value at corresponding intensity level in the cost function, calculating the total cost for each exposure value by for each histogram related to a specific exposure value adding the product of each multiplication for substantially all intensity levels in the histogram, and using the calculated total cost for each exposure value in an algorithm for finding the lowest total cost and the corresponding exposure value. By calculating total costs like described in this embodiment the process may use less processing capacity and may become even faster.

In another embodiment the cost function is a function of the performance of the image sensor at specific intensity levels.

In yet another embodiment one iteration of determining the temporary exposure value, determining the saturated pixel cost, and determining the next exposure value is based on the same captured image data.

According to one embodiment the saturated pixels cost is calculated as the number of saturated pixels in the image data at the temporary exposure value multiplied with a predetermined cost value for saturated pixels.

According to another embodiment pixels belonging to areas of particular interest in the image frame are counted a plurality of times in the calculation of the total cost. The advantage of this embodiment is that the exposure settings may easily and quickly be prioritising or giving more weight to limited areas or recognised objects in image frames. Thus, a more relevant and/or correct exposure may be achieved.

According to yet another embodiment pixels belonging to areas of particular interest in the image frame are counted a plurality of times in the calculation of the total cost for non-saturated pixels. The advantage of this embodiment is that the exposure settings may easily and quickly be prioritising or giving more weight to limited areas or recognised objects in image frames. Thus, a more relevant and/or correct exposure may be achieved.

According to another aspect of the present invention an image capturing device comprises an image sensor arranged to capture image frames, a memory storing an exposure value, an exposure controller arranged to control the exposure of the image to be captured by the image sensor based on the exposure value stored in the memory, means for determining a temporary exposure value by finding an exposure value that results in a substantially optimum value when applied to a total cost calculation, wherein the calculating of said total cost from a specific exposure value is based on signal levels at the specific exposure value of image pixels in the captured image frame combined with a cost function, a saturated pixels cost calculator arranged to calculating a saturated pixels cost related to the saturated pixels for the captured image at the temporary exposure value, means for determining a next exposure value by finding a decrease in exposure value, in relation to the temporary exposure value, for which decrease in exposure value a change in total cost for non-saturated pixels, in relation to the total cost for non-saturated pixels at the temporary exposure value, is substantially equal to the saturated pixel cost calculated at the temporary exposure value, storing next exposure value in memory as the exposure value.

In another embodiment the image capturing device further comprises a motion video encoder arranged to receive the captured image frame and add it into a motion video stream.

In yet another embodiment the cost function is a function of the performance of the image sensor at specific intensity levels.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description. Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a sensor" or "the sensor" may include several sensors, and the like. Furthermore, the word "comprising" does not exclude other elements or steps.

BRIEF DESCRIPTION OF THE DRAWINGS

Other features and advantages of the present invention will become apparent from the following detailed description of a presently preferred embodiment, with reference to the accompanying drawings, in which.

Further, in the figures like reference characters designate like or corresponding parts throughout the several figures.

DETAILED DESCRIPTION OF THE PREFERRED EMBODIMENTS

A camera implementing the invention may according to one embodiment be any type of camera including an image sensor and processing capacity. The advantages of the invention are more evident when capturing motion video than when capturing still images.

Figure 1:
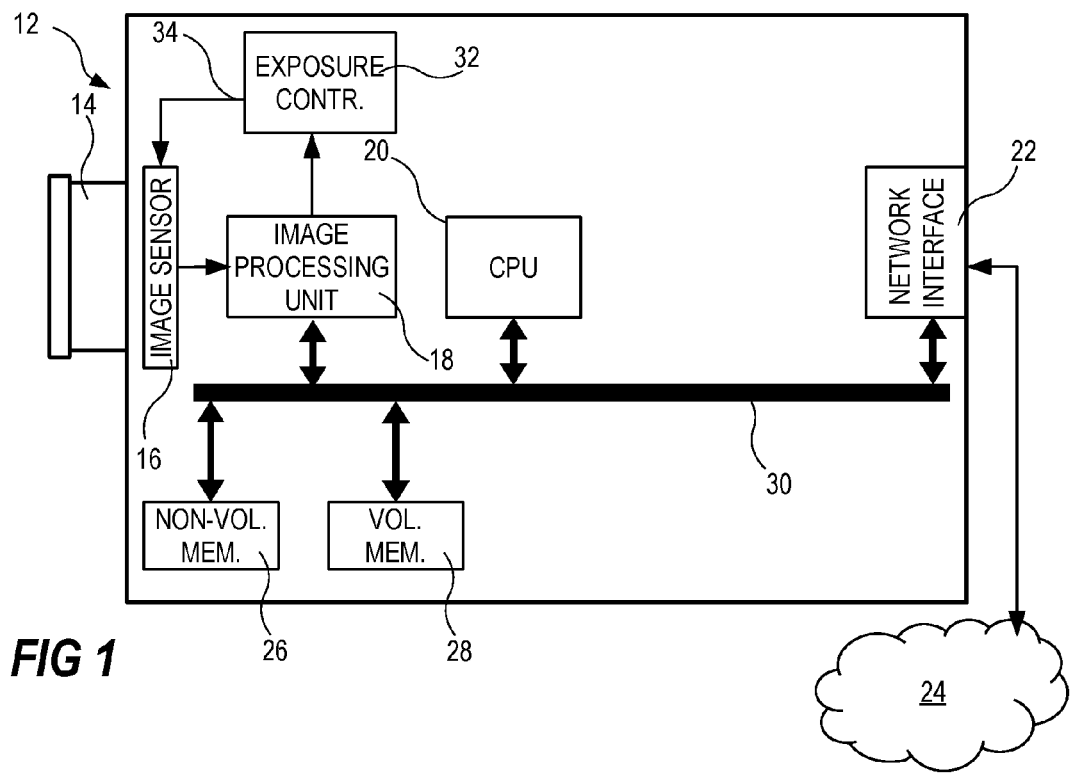
FIG. 1 shows a schematic block diagram of an embodiment of the present invention.

In FIG. 1 a camera 12 according to one embodiment of the invention is schematically depicted. The camera includes a lens 14 focusing the light from the scene to be captured onto an image sensor 16. The image information captured by the image sensor 16 is converted to digital image data. This may be performed by an analogue to digital converter (A/D-converter) arranged in the image sensor 16, in a separate block, or in an image processing unit 18. The image processing unit 18 process the image data and may perform demosaicing, colour adjustments, calculations of exposure settings, auto-focus processing, encoding captured image data into motion video streams or still images, calculate histograms, etc. The image processing unit 18 may be arranged to run algorithms described below relating to the determining of the exposure settings to use. A central processing unit 20 is arranged to control general functions of the camera 12, e.g. user interfaces, server functionality, etc. The camera 12 may also include a network interface 22 for connecting the camera to a computer network 24.

Moreover a non-volatile memory 26 may be arranged to store instructions for execution by the image processing unit 18 and the central processing unit 20. The camera 12 may include one common non-volatile memory 26 for the image processing unit 18 and the central processing unit 20 or it may include separate non-volatile memories 26 for each of the image processing unit 18 and the central processing unit 20. At least one volatile memory 28 is arranged as working memory for the processing units 18, 20. Internal communication and data transport may be performed via an internal bus 30.

Moreover, the camera 12 includes an exposure controller 32. The exposure controller 32 may be a specific control circuit, a function block of the image processing unit 18 or the central processing unit 20, or a combination of a specific control circuit and a function block. The exposure controller 32 have a shutter control output 34 connected to the image sensor 16 for controlling the shutter function of the image sensor 16. If the camera includes a mechanical shutter the shutter output 34 is connected to the mechanical shutter. The exposure controller 32 may be designed to control exposure time, aperture size, gain, etc.

A process for generating exposure settings for the camera 12 according to one embodiment of the invention will be described below with references to FIG. 2. In this embodiment the process 200 of generating the exposure settings is an integral part of the process of capturing motion video. The process starts using a preset exposure value $e_i$ as exposure value, step 202. The preset value may be an exposure value stored in memory 26 or 28 when the image capturing begins. The exposure settings are then based on the exposure value e, step 204. An image is captured by means of the image sensor 16 of the camera 12 using the exposure settings derived from the exposure value e, step 206. The exposure value e may be temporarily stored in the volatile memory 26. Histogram data is generated from the captured image, step 208. The histogram data represents the number of pixels captured for each light intensity level. This histogram data is commonly depicted as a graph in a diagram where the number of pixels plotted against the y-axis, the ordinate value, and the light intensity level is plotted against the x-axis, abscissa value, examples are showed in FIGS. 3 and 4.

The histogram data and a cost function, defining the cost as a function of intensity level, are then used for calculating a total cost value C(e) for the presently used exposure value and thereby the presently used exposure settings, step 210. This calculation is then performed for a number of different histograms, which are predicted as based on the image data in the image captured in step 206, in order to find the substantially lowest cost, which could be represented by the highest value or by the lowest value depending on the cost function implemented. In the process this search for the lowest cost is symbolised by the process steps 212, in which a check is performed relating to if the minimum cost has been found, and by the loop back via step 214, in which the exposure value e is changed and the prediction of a new histogram is performed by means of a calculation based on the captured image and this changed exposure value e, to the step of calculating the cost for the new exposure value in step 210. The change of the exposure value e is performed in concurrence with the algorithm used for finding the exposure value resulting in the lowest cost.

When the algorithm used for finding the exposure value resulting in the lowest cost has found the exposure value resulting in the substantially lowest cost, this exposure value is stored as a temporary exposure value $e_{temp}$, step 216.

At the temporary exposure value $e_{temp}$ there are likely to be saturated pixels in the calculated histogram, i.e. pixels representing an intensity level higher or equal to the highest intensity level the present image representation may register. The cost $C_{sat}$ for these saturated pixels is calculated based on the part of the cost function that relates to the saturated pixels only, step 218. As the saturated pixels are represented by the highest light intensity level, the calculation of the cost may be performed simply by multiplying the number of saturated pixels with the cost value in the cost function representing the cost for the highest intensity.

A truncated histogram is then calculated for the exposure value e, which exposure value e initially equals $e_{temp}$, step 220. In the present application a truncated histogram is a histogram representing all pixels except the pixels that are saturated at the exposure value $e_{temp}$. The truncated histogram is, independent of the exposure value to be used for the calculation, calculated for the pixels not saturated at the temporary exposure value of $e_{temp}$. Then a total cost $C_{trunc}(e)$ for the image at the exposure value e is calculated based on the truncated histogram at exposure value e and the cost function, step 222. In step 224 the process checks if the total cost for the truncated histogram at the present exposure value $C_{trunc}(e)$ has increased in relation to the total cost for the truncated histogram at the temporary exposure value $C_{trunc}(e_{temp})$ in such a degree that the increase substantially equals $C_{sat}$, i.e. if $C_{trunc}(e)-C_{trunc}(e_{temp})=C_{sat}$. If not the increase in total cost substantially equals $C_{sat}$ then the exposure value e is changed, step 226, in accordance with an algorithm for finding an exposure value that makes the cost of the truncated histogram $C_{trunk}(e)$ substantially equal to the cost of the saturated pixels $C_{sat}$. Then the process returns to steps 220 and 222 for calculating a truncated histogram and a cost value $C_{trunk}(e)$ for the new exposure value e.

When it is found at step 224 that the increase in total cost for the truncated histogram, $C_{trunc}(e)-C_{trunc}(e_{temp})$, substantially equals $C_{sat}$ then the exposure value for the next image in an image sequence is determined and the process returns to step 204 for capturing the next image and then check the exposure again.

In another embodiment no histogram is calculated for the captured image frame. Instead, the cost function is applied to substantially each individual pixel and summed to a total cost value.

The exposure value used and discussed in the above described embodiments is a value that defines the exposure settings for the camera. The exposure value may at least determine any one of or any combination of exposure time, aperture size, and gain. In the examples of this description the relation between the exposure value and the exposure settings is such that after an increase of the exposure value by 25% an increase in all light intensity levels, hereinafter referred to as signal levels, of 25% is expected. The light intensity level results in a signal level output from the image sensor, this signal level may also be referred to as a pixel value. Even if this relation between exposure value and resulting total light intensity levels for the camera in which the invention is implemented is not as linear as described above, the assumed relation described above is good enough to base predictions of histograms on. The skilled person would appreciate that the values and relations between the exposure value and the exposure settings may be selected differently and still achieve the same effect.

Accordingly, in the calculations of histograms representing other exposure values than the exposure value of the captured image data, which captured image data these calculated histograms are based on, the change in exposure value in respect of the exposure value of the captured image data may be used to calculate new histograms. As described above the ratio between the desired exposure ewes value and the exposure value, original exposure value $-e_{org}$, of the captured image, i.e. ratio=$e_{des}/e_{org}$, may be used in the calculation of the new histogram by multiplying each pixels signal level or by multiplying each entry in the histogram by the ratio. However, calculations for predicting a histogram using exposure values lower than the original exposure value may introduce serious errors as the saturated pixels in the captured image data is stored as having the highest possible signal level and the captured image data does not include any information of how much greater than the saturation level the real value of each saturated pixel is. Therefore, a recalculation of the histogram based on the captured image data for a lower exposure value would only move the pixels at the saturation signal level to a lower signal level and leaving the signal levels between this lower signal level and the value for the saturated signal level totally void of any data.

Figure 3:
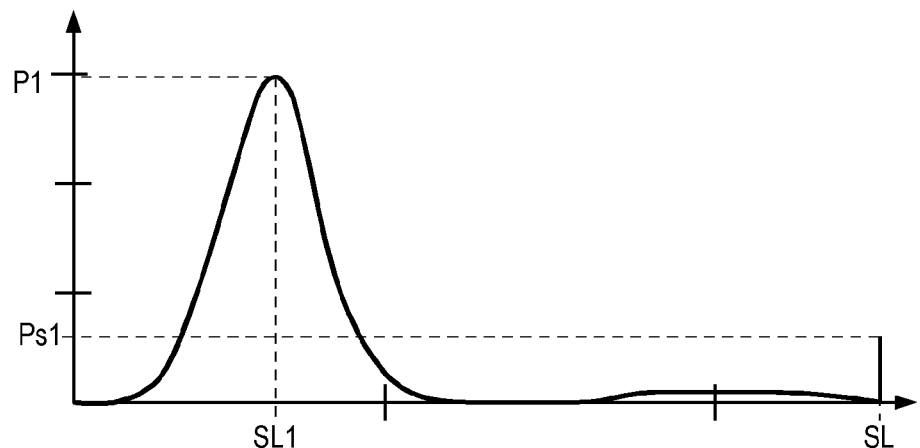
FIG. 3 shows an example histogram of a captured image frame at a specific exposure value.
Figure 4:
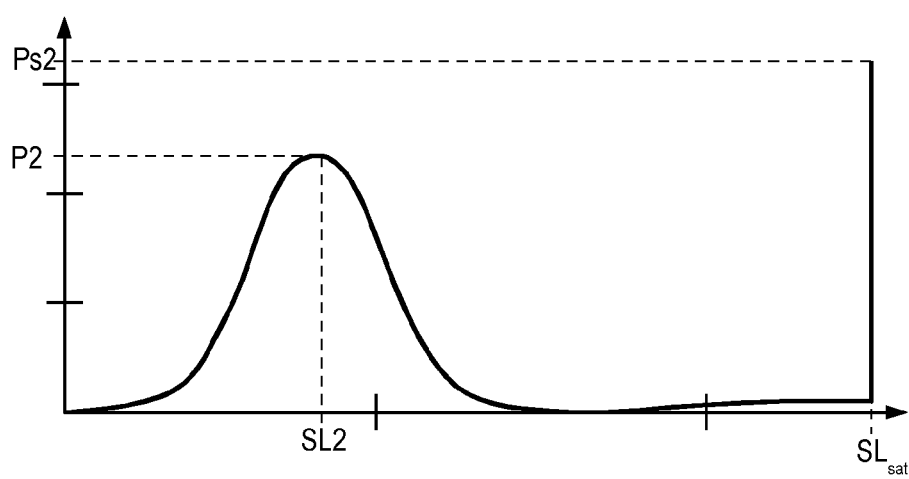
FIG. 4 shows the histogram of FIG. 3 recalculated for a higher exposure value.

A histogram may be presented as diagrams, see FIGS. 3 and 4. The histogram in FIG. 3 may for instance represent the histogram of a captured image having most pixels at the signal level SL1 and the number of pixels at this level is P1. The number of saturated pixels Ps is indicated at the saturation signal level $s_{sat}$. This histogram is based on image data captured at an exposure value $e_1$. The histogram in FIG. 4 is representing a recalculated histogram, calculated from the image data represented by the histogram of FIG. 3, at an exposure value $e_2$, which is 1.25 times higher than $e_1$, i.e. an increase of 25% in exposure value. As seen in FIG. 4 the peek representing the most pixels of a signal level SL2 has moved to a higher signal level than the corresponding position in the histogram representing the lower exposure value. This increase in exposure value also results in that a greater number of pixels will reach the signal level representing saturated pixels, compare number of saturated pixels Ps1 in FIG. 3 with the number of saturated pixels Ps2 in FIG. 4.

According to one embodiment a histogram is described as a function h(s) where s is the signal level and it is limited to values between 0 and $s_{sat}$. The calculation of a new histogram h'(s) for an exposure change e, which may correspond to the ratio discussed above, may be described by equation 1 for the unsaturated part of the new histogram.

$$h'(s) = h\left(\frac{s}{e}\right) \text{ for } s < \begin{cases} \frac{s_{sat}}{e} & \text{if } e < 1 \\ s_{sat} & \text{if } e \geq 1 \end{cases} \quad \text{equation 1}$$

The cost function discussed above may be defined as a function that gives the fitness of a specific pixel value. The cost function is representing signal levels in the captured images and may also include a value for saturated pixels. There are a many types of cost functions that may be used for this purpose. Moreover, the cost function may take spatial aspects into account when calculating the cost, i.e. the cost function may be arranged to consider the contents of a captured image. According to one embodiment the cost function is based on the noise level for pixels at different signal levels. This means that the algorithm described above is arranged to find an exposure value that produce an image having low overall noise and that still produces a substantially stable image sequence in view of exposure.

A cost function may accordingly be based on the noise. Read noise, $n_r$, and photon shot noise, $n_s$, are generally the main noise sources in camera applications. The read noise is constant regardless of the signal level while the shot noise may be calculated as the square root of the signal level, s.

$$n_r = 1 \quad \text{equation 2}$$

$$n_s = \sqrt{s} \quad \text{equation 3}$$

$$n_{total} = \sqrt{n_s^2 + n_r^2} = \sqrt{s + n_r^2} \quad \text{equation 4}$$

In one embodiment cost function is based on the signal to noise ratio, SNR, over the range of signal levels of the system. Such a cost function is presented in equation 5.

$$c(s) = \frac{s}{n_{total}} = \frac{s}{\sqrt{s + n_r^2}} \quad s < s_{sat} \quad \text{equation 5}$$

$$c(s) = \text{constant} \quad s \geq s_{sat}$$

Figure 5:
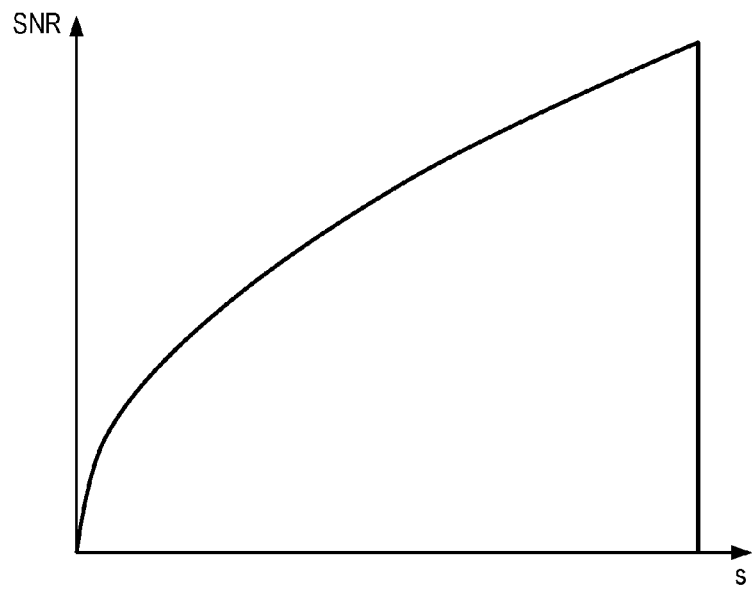
FIG. 5 shows an example graph of how a cost function for an image sensor may vary in view of signal level of image elements.

When such a cost function is plotted in a diagram it may look like the graph presented in FIG. 5. From the graph it is evident that the signal to noise ratio is quite bad at low signal levels and that it becomes better at increasing signal levels. The abrupt ending of the graph merely indicates that the maximum signal level for an image sensor is reached and there is no signal to noise ratio beyond this value.

By combining the cost function and a histogram for a particular exposure the total cost for the exposure may be calculated, see equation 6.

$$c_h = \Sigma_{s=0}^{s_{max}} c(s) \cdot h(s) \quad \text{equation 6}$$

In this equation $s_{max}$ is the highest signal level represented in the image capturing device.

Hence, it should be easy to find the best exposure by finding a histogram that generates the highest value, as the cost function is defined as having a high value at the best pixel quality. Therefore it would be enough to find the exposure value generating the highest ch value.

However, if only this maximising approach is implemented then a captured motion video will experience oscillations in the exposure and these oscillations may be severely disturbing for a viewer. In particular if the camera is part of a surveillance system where an operator is having the motion video up on a screen for longer periods of time such oscillating effects of the exposure of the imagery may even be harmful to the operator. The problem behind this oscillation phenomenon may be found in the handling of the saturated pixels. For example, if the image currently is too dark we have too few saturated pixels, but we can predict how many more pixels that will be saturated for a given increase of exposure. This means that we can choose a new exposure that yields the desired number of saturated pixels directly. On the other hand, if the image currently is too bright and we need to decrease the exposure, we have no way of telling what number of pixels that will become desaturated for a given exposure decrease which in turn means that we cannot directly find a new exposure. One solution to this problem is to divide the algorithm into two exposure determining steps. Therefore, the algorithm presented in connection with FIG. 2 includes a first part of finding an optimal cost for images exposed using various exposure values and a second part in which the exposure value is adjusted in view of saturated pixels. According to one embodiment, the first part only tests exposure values that are higher than the exposure value of the captured image and the second part only tests exposure values that are lower than the temporary exposure value.

Figure 2:
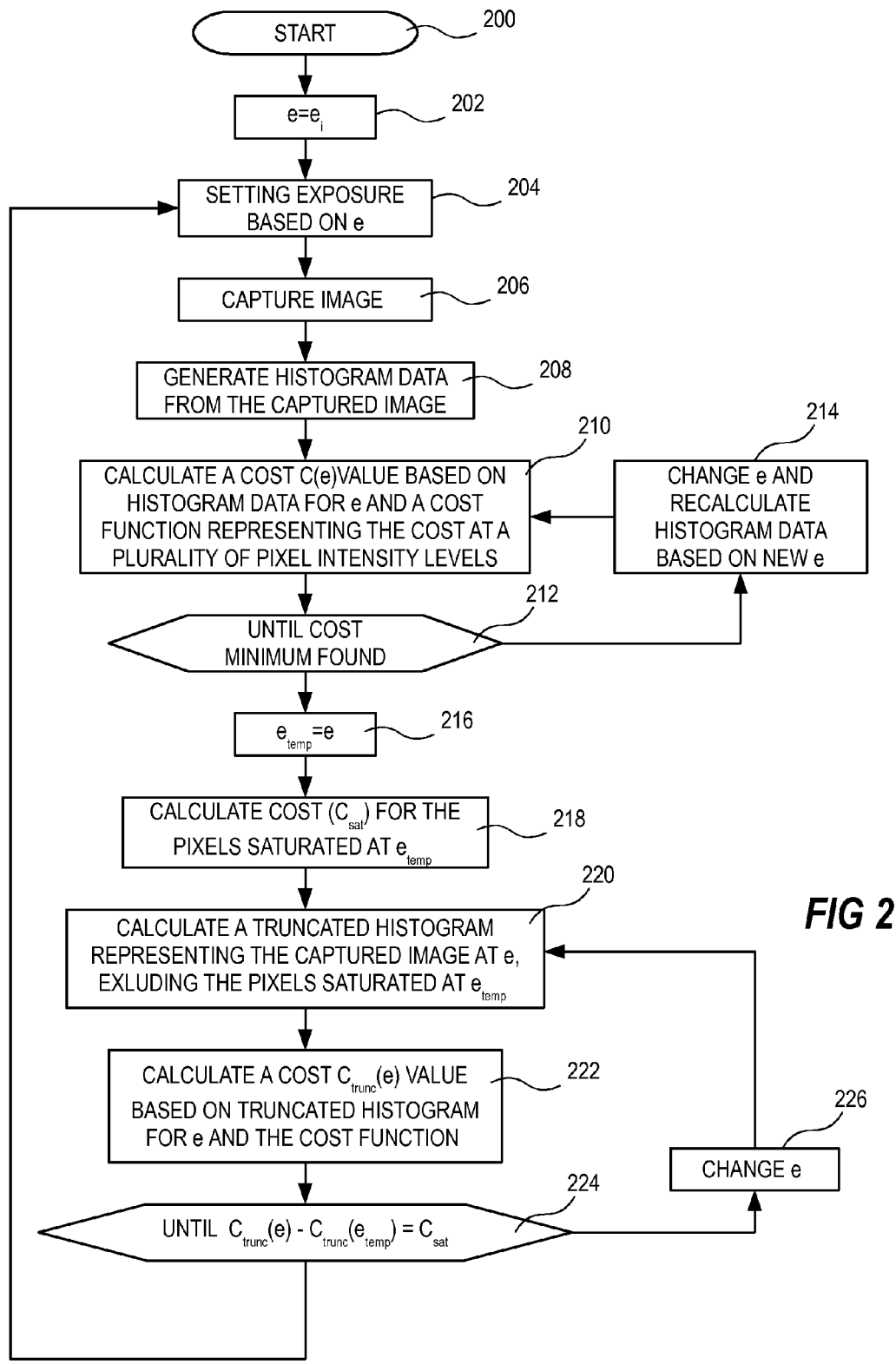
FIG. 2 shows a flowchart over a process according to one embodiment of the invention.

Referring to FIG. 2, according to one embodiment the first part of finding an exposure value including the steps 210, 212, 214, is arranged to only evaluate, as mentioned above, exposures having exposure values greater than the exposure value used for capture the image in step 206. The advantage of only evaluating the greater exposure values is that known data may be used and assumptions relating to at which exposure value a saturated pixel in the captured image will be desaturated is avoided. Accordingly, an exposure value that is greater than the exposure value used for capture the image and that yields an optimal cost is searched for. When determined this exposure value, referred to as the temporary exposure value $e_{temp}$, is used in the continued process. As the first part is arranged to only increase the exposure value the second part is arranged to find out if the exposure value has to be decreased.

This second part includes the steps 218, 220, 222, 224, and 226 and is as mentioned earlier arranged to evaluating the impact of the saturated pixels on the image. In one embodiment this is achieved by calculating how much extra cost that is tolerated in view of the number of saturated pixels at the temporary exposure value $e_{temp}$. The calculation of the cost for the saturated pixels discussed in connection with step 218 may be performed by having a constant cost value defined for saturated pixels and then multiplying this cost value with the number of pixels that is calculated to be saturated at the temporary exposure value. This cost of the saturated pixels is then used as a value for the tolerated cost increase.

A histogram excluding the saturated pixels is then used in steps 220, 222, 224, and 226. This histogram is called truncated histogram. By using this truncated histogram the problem of not knowing when to desaturate a saturated pixel when decreasing the exposure value is overcome. As described in relation to steps 220, 222, 224, and 226, the truncated histogram is calculated and the cost for the truncated histogram at the present exposure value is calculated. The exposure value is then decreased until the total cost of the histogram calculated at the present exposure value has been decreased by a value substantially corresponding to the cost calculated for the saturated pixels at the temporary exposure value. The exposure value resulting from this process may then be used as the exposure value for capturing the next image.

Figure 6:
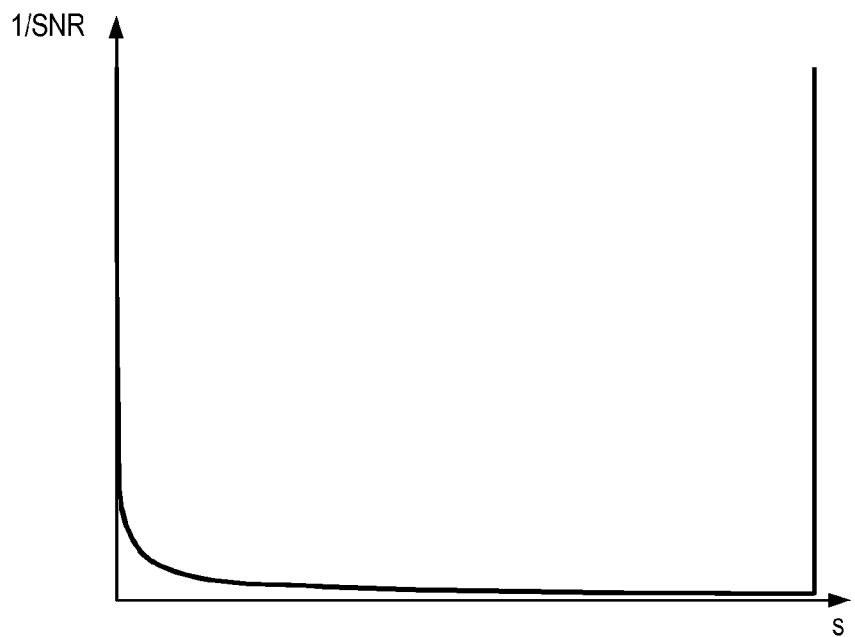
FIG. 6 shows an example of an alternative cost function and how it varies in view of signal level of image elements.

According to one embodiment the SNR used in the cost function is replaced by an inverted SNR function, e.g. Noise to Signal ratio, see FIG. 6. By basing the cost function on the inverted SNR function instead of the SNR function the first process step will find the optimal temporary exposure value as the minimum value instead of a maximum value. Moreover, the cost function based on SNR, inverted or not, is depending on the gain used at each exposure. However, recalculating the cost function every time the gain is changed is not effective from a device performance view. In one embodiment the saturation cost for different exposures is altered instead. This results in substantially the same effect as recalculating the cost function, but at a substantially reduced computational complexity. The saturation cost at different exposure levels may be a parameter that is configured subjectively when the algorithm is set up.

Figure 7:
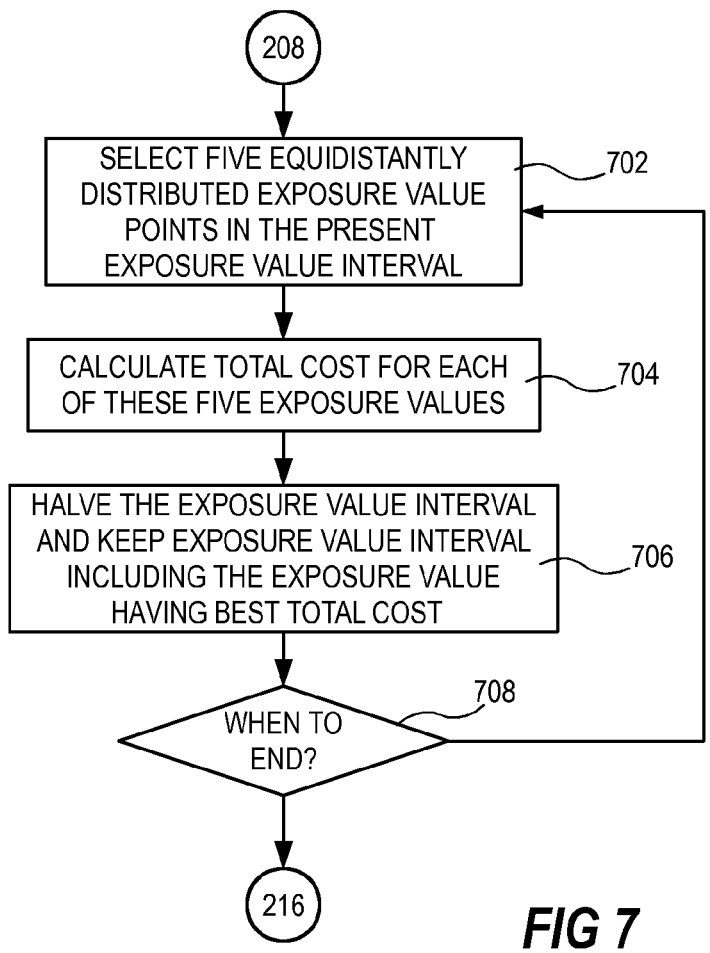
FIG. 7 shows a flowchart over alternative process for finding a temporary exposure value in FIG. 2.

In the process of finding the optimal exposure value during the first part of the process described in connection with FIG. 2 a modified bisection search method may be used. This search method is illustrated in the flowchart in FIG. 7 and the process may be inserted directly between the process steps 208 and 216 in FIG. 2, replacing process steps currently there in FIG. 2. The search method includes selecting five equidistantly distributed exposure value points in a present exposure value interval, step 702. The initial exposure value interval is a predefined exposure value interval including reasonable exposure values. Then the histograms for these five exposure values are calculated and the total cost for each exposure value point is calculated based on the cost function and histograms for each exposure value, step 704. The present exposure value interval is divided in two halves and the half of the present exposure value interval that includes the exposure value resulting in the best total cost is selected as a new present exposure value interval, step 706. The best total cost may be the lowest value or the highest value depending on the cost function used. In step 708 it is decided if the process is to return to step 702 or if the process are to continue. According to one embodiment the process of finding the optimal exposure value during the first part is arranged to end after three iterations and the process has defined that a substantially optimal exposure value is found after three iterations. This gives enough precision for many implementations. However, the process may be ended after a higher predetermined number of iterations if the application benefits from it. Alternatively, the process of finding a substantially optimal exposure value may end when the change in total cost between two consecutive calculations of the total cost at different exposure values is less than a predetermined threshold.

In the process in the second part, the process of finding the exposure value for which the change in total cost of the truncated histogram, compared to the cost related to the temporary exposure value of the truncated histogram, is substantially equal to the cost for the saturated pixels at the temporary exposure value, a standard bisection method may be applied for the search. This process may also implement the limit of three iterations for finding a substantially optimal value. However, the process may be ended after a higher predetermined number of iterations if the application benefits from it. Alternatively, the process of finding a substantially optimal exposure value may end when the difference between the change total cost and the cost for the saturated pixels is less than a predetermined threshold.

In an alternative embodiment the cost function is recalculated instead of the histogram. In some cases it is less computational demanding to recalculate the cost function than recalculating the histogram. When simulating the increase of the exposure value the cost function may instead be compressed in the signal level direction and when simulating the decrease of the exposure value the cost function may be stretched in the signal level direction. For the cases of simulating increased exposure value the saturated pixels will be pixels having a signal level that is higher than the highest signal level position of the compressed cost function. The highest signal level in the cost function may also represent saturated pixels and the cost for these.

In the above embodiments the cost function is described as being function of noise level only. However, the cost function may be based on motion and identified types of image features, e.g. object recognition, face recognition, etc. One way of implementing these additional cost features is to still base the cost function on the SNR but then making pixels representing movements in a captured scene, or pixels representing specific objects count more or less, depending on if you want them to have a greater or lesser impact on the exposure setting. One simple way of implementing this is to make each pixel detected as having motion or being part of an object to be detected count as a plurality of pixels. A pixel counted as a plurality of pixels is to be interpreted as a pixel counted as more than one pixel, i.e. x times the pixel where x may be any real number. For example, pixels in an area identified as a face may be counted as 1.34 pixels when applied for the cost calculation or it may be counted as 2 pixels, depending on how much the exposure of a face should impact the exposure setting.

What is claimed is:

1. A method comprising:
   capturing an image frame by means of an image sensor, the exposure of the capturing is based on an initial exposure value setting,
   determining a temporary exposure value by finding an exposure value that results in a substantially optimum value when applied to a total cost calculation, wherein the calculating of said total cost from a specific exposure value is based on signal levels at the specific exposure value of image pixels in the captured image frame combined with a cost function,
   calculating a saturated pixels cost related to the saturated pixels for the captured image at the temporary exposure value,
   determining a next exposure value by finding a decrease in exposure value, in relation to the temporary exposure value, for which decrease in exposure value a change in total cost for non-saturated pixels, in relation to the total cost for non-saturated pixels at the temporary exposure value, is substantially equal to the saturated pixel cost calculated at the temporary exposure value, and using this determined next exposure value for capturing a new image frame.

2. The method of claim 1, further including inserting substantially every captured image frame in a motion video stream.

3. The method of claim 1, wherein the capturing of the new image frame initiates repetition of the steps of determining a temporary exposure value, determining a saturated pixel cost value, and determining a next exposure value for capturing a further image frame.

4. The method of claim 1, wherein the calculation of the total cost is based on a histogram of the captured image combined with a cost function, the histogram is representing number of pixels at different intensity levels of the captured image frame at the specific exposure value.

5. The method of claim 4, wherein a histogram is a function representing the number of image sensor elements of an image sensor that receive light at specific intensity levels during a frame exposure.

6. The method of claim 1, wherein the act of calculating a total cost for a specific exposure value, in the act of determining a temporary exposure value, includes calculating from the captured image data a plurality of histograms representing different exposure values, multiplying the histogram value for each registered intensity level with a cost value at corresponding intensity level in the cost function, calculating the total cost for each exposure value by for each histogram related to a specific exposure value adding the product of each multiplication for substantially all intensity levels in the histogram, and using the calculated total cost for each exposure value in an algorithm for finding the lowest total cost and the corresponding exposure value.

7. The method of claim 1, wherein the cost function is a function of the performance of the image sensor at specific intensity levels.

8. The method of claim 1, wherein one iteration of determining the temporary exposure value, determining the saturated pixel cost, and determining the next exposure value is based on the same captured image data.

9. The method of claim 1, wherein the saturated pixels cost is calculated as the number of saturated pixels in the image data at the temporary exposure value multiplied with a predetermined cost value for saturated pixels.

10. The method of claim 1, wherein pixels belonging to areas of particular interest in the image frame are counted a plurality of times in the calculation of the total cost.

11. The method of claim 1, wherein pixels belonging to areas of particular interest in the image frame are counted a plurality of times in the calculation of the total cost for non-saturated pixels.

12. An image capturing device comprising:
an image sensor arranged to capture image frames;
a memory storing an exposure value;
an exposure controller arranged to control the exposure of the image to be captured by the image sensor based on the exposure value stored in the memory;
a processing unit arranged to determine a first exposure value by finding an exposure value that results in a substantially optimum value when applied to a total cost calculation, wherein the calculating of said total cost from a specific exposure value is based on signal levels at the specific exposure value of image pixels in the captured image frame combined with a cost function;
a saturated pixels cost calculator arranged to calculating a saturated pixels cost related to the saturated pixels for the captured image at the first exposure value;
the processing unit further arranged to determine a second exposure value by finding a decrease in exposure value, in relation to the first exposure value, for which decrease in exposure value a change in total cost for non-saturated pixels, in relation to the total cost for non-saturated pixels at the first exposure value, is substantially equal to the saturated pixel cost calculated at the first exposure value; and
storing the second exposure value in memory as the exposure value.

13. The image capturing device of claim 12, further comprising a motion video encoder arranged to receive the captured image frame and add it into a motion video stream.

14. The image capturing device of claim 12, wherein the cost function is a function of the performance of the image sensor at specific intensity levels.

* * * * *